(12) United States Patent
Singh et al.

(10) Patent No.: US 12,278,864 B2
(45) Date of Patent: Apr. 15, 2025

(54) FILE SHARING FRAMEWORK IN NETWORK SECURITY SYSTEMS TO SYNCHRONIZE DATA AND CONFIGURATION FILES ACROSS VIRTUAL MACHINE CLUSTERS INDEPENDENT OF FILE SHARING TECHNOLOGIES

(71) Applicant: Fortinet, Inc., Sunnyvale, CA (US)

(72) Inventors: Chaturbhuj Singh, Pune (IN); Niraj Nandane, Pune (IN); Pooja Singh, Pune (IN)

(73) Assignee: Fortinet, Inc., Sunnyvale, CA (US)

( * ) Notice: Subject to any disclaimer, the term of this patent is extended or adjusted under 35 U.S.C. 154(b) by 399 days.

(21) Appl. No.: 17/566,863

(22) Filed: Dec. 31, 2021

(65) Prior Publication Data
US 2023/0216917 A1 Jul. 6, 2023

(51) Int. Cl.
*H04L 67/1095* (2022.01)
(52) U.S. Cl.
CPC ................................ *H04L 67/1095* (2013.01)
(58) Field of Classification Search
CPC .......................... H04L 67/1095; G06F 9/45558
See application file for complete search history.

(56) References Cited

U.S. PATENT DOCUMENTS

| 11,714,683 B1* | 8/2023 | Roberts | G06F 9/44536 |
| | | | 709/223 |
| 2022/0156396 A1* | 5/2022 | Bednash | G06F 21/554 |
| 2022/0191251 A1* | 6/2022 | Gavish | H04L 63/101 |
| 2022/0353295 A1* | 11/2022 | Yeh | H04L 63/029 |

\* cited by examiner

*Primary Examiner* — Emmanuel L Moise
*Assistant Examiner* — Xiang Yu
(74) *Attorney, Agent, or Firm* — Law Office of Dorian Cartwright; Dorian Cartwright

(57) ABSTRACT

A source node from the cluster of nodes, responsive to receiving the file sharing command from other applications on the same node (e.g., on a virtual machine in the cluster of nodes), copies the shared file to a source workspace directory and compress, and then copy the compressed file to the file sync database. The command comprises a configuration template with file retrieval information. A target node from the cluster of nodes, listens for commands from other nodes in the cluster of nodes. Responsive to receiving the file sharing command, the compressed file is copied from the file sync database to a target workspace directory and decompress, and then copy the shared file to node.

14 Claims, 7 Drawing Sheets

100A

FILE SHARING FRAMEWORK IN NETWORK SECURITY SYSTEMS TO SYNCHRONIZE DATA AND CONFIGURATION FILES ACROSS VIRTUAL MACHINE CLUSTERS INDEPENDENT OF FILE SHARING TECHNOLOGIES

FIELD OF THE INVENTION

The invention relates generally to computer networking, and more specifically, to a file sharing framework in network security systems to synchronize data and configuration files across virtual machine clusters.

BACKGROUND

SOAR (security orchestration, automation and response) technology helps coordinate, execute and automate tasks between various people and tools. This in turn allows entities to respond quickly to cybersecurity attacks and improve their overall security posture. SOAR tools need to keep files synchronized to keep uniform protection around an enterprise network.

SOAR tools, and multiple other similar software products, need to be deployed as a cluster across multiple virtual machines for scale and high availability. This requires the database as well as certain file system components to be sync. For syncing the file system components, the available technologies are OS/platform specific and require a dedicated communication port, user and permissions apart from the already open database replication route. Problematically, virtual machines that support SOAR tools can use one of many different file sharing technologies. As a result, file sharing is limited to those with compatible systems.

Therefore, what is needed is a robust technique for sharing data and configuration files to synchronize a plurality of virtual machines independent of file sharing technology.

SUMMARY

These shortcomings are addressed by the present disclosure of methods, computer program products, and systems for sharing data and configuration files to synchronize a plurality of virtual machines independent of file sharing technology.

In one embodiment, a file sync database stores shared data and configuration files to support security operations on the cluster of nodes. A file sync controller can receive notification of a file sharing command to share a specific file across at least two of the plurality of virtual machines as indicated in the file sharing command.

In another embodiment, source node from the cluster of nodes, responsive to receiving the file sharing command from a virtual machine in the cluster of nodes, copies the shared file to a source workspace directory and compress, and then copy the compressed file to the file sync database. The command comprises a configuration template with file retrieval information. A target node from the cluster of nodes, listens for commands from other nodes in the cluster of nodes. Responsive to receiving the file sharing command, the compressed file is copied to a target workspace directory and decompress, and then copy the shared file to node.

Advantageously, computer network performance is improved with synchronized files for security and other applications.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for sharing data and configuration files to synchronize a plurality of virtual machines independent of file sharing technology.

One of ordinary skill in the art will recognize many additional variations made possible by the succinct description of techniques below.

I. Systems for Synchronizing VMs without File Sharing Technology (FIGS. 1-2)

Figure 1A:
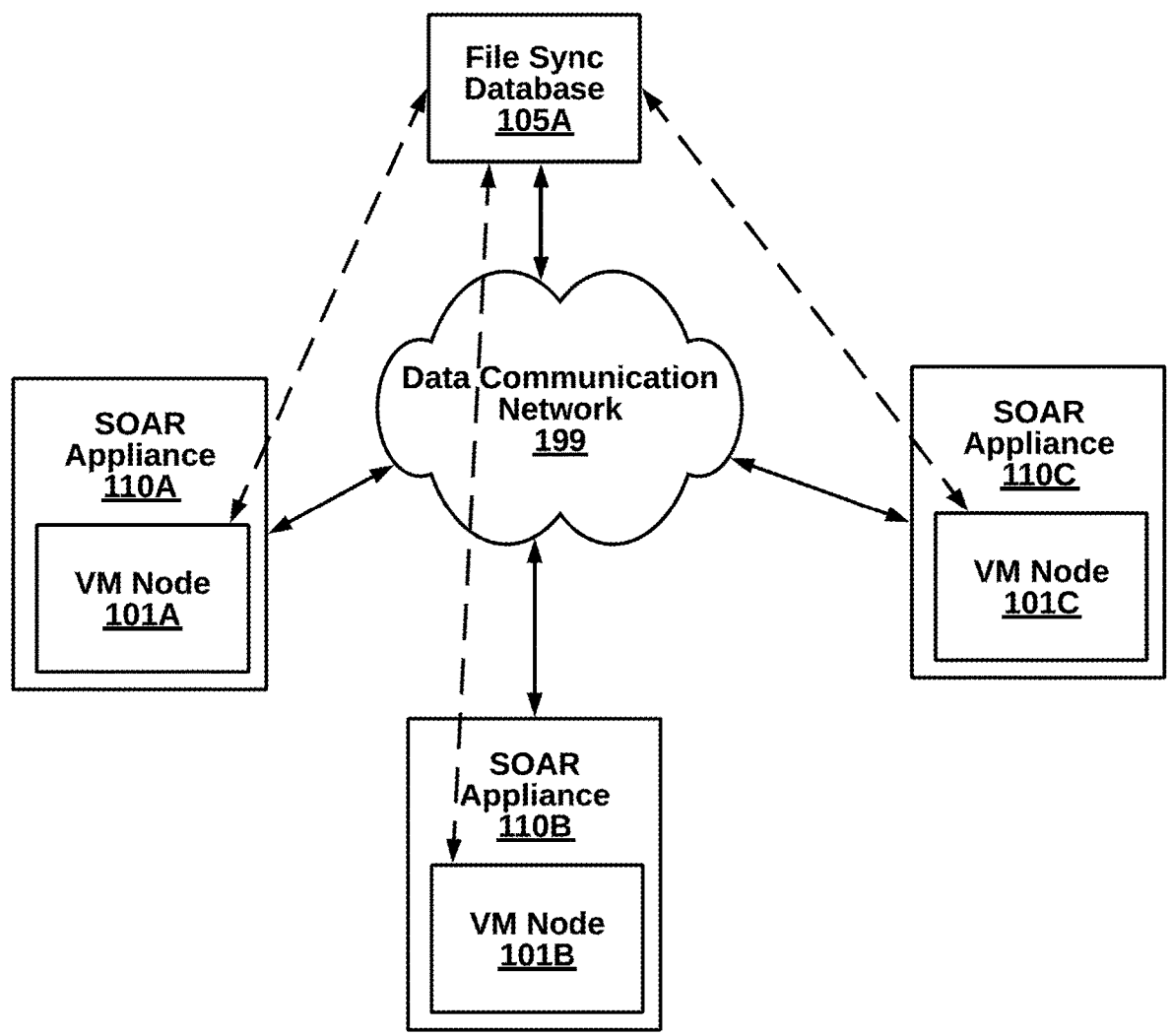
FIG. 1A is a block diagram illustrating a file sharing system for sharing data and configuration files to synchronize a plurality of virtual machines independent of file sharing technology, according to an embodiment.

FIG. 1A is a block diagram illustrating a file sharing system 100A for sharing data and configuration files to synchronize a plurality of virtual machines independent of file sharing technology, according to an embodiment. The system 100A includes a file sync database 105A and SOAR appliances 110A-C coupled to a data communication network 199. Many other configurations are possible, for example, with additional network components such routers, switches, repeaters, firewalls, and the like. Also, there can be many more or fewer clients in FIG. 1. The system components can be implemented in computer devices with non-transitory source code, such as set forth below with reference to FIG. 6.

The components of the system 100 are coupled in communication over the data communication network. The components can be connected to the data communication system via hard wire. The data communication network 199 can be any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11.

In one embodiment, the file sync database 105 stores shared data and configuration files to support security operations on the cluster of nodes. In one case, a new Python script is distributed across a SOAR security system. More specifically, Python is a programming language used in cybersecurity to automate processes, customize tools, and automate and orchestrate security response operations. Playbooks are Python scripts that execute various actions in response to an incident. Other embodiments are possible outside of SOAR or security systems. The file sync database 105 can be remotely located outside of a private network with the SOAR appliances 110A-C, and can be run by a third-party as a SaaS (software as a service). Alternatively, the remote file sync database 105A can operate across different LANs of a single entity in which VM nodes 101A-C are remotely located from each other.

The SOAR appliances 110A-C further comprise VM nodes 120A-C respectively. Any of the SOAR appliances 110A-C can be within the network (e.g., a gateway device or an access point) or on the edge of the network (e.g., a Wi-Fi station). The VM nodes 101A-C can be a pool of VMs running applications that send out sync commands. Any of the nodes can be a source node or a target node, depending on the transaction. VMs allow an operating system to run in an app that behaves like a full, separate computer in a sandboxed environment. SOAR systems may use VMs to run a suspicious file and observe whether harmful behavior is present. The VM nodes 120A-C are described in further detail below with respect to FIG. 2.

Figure 1B:
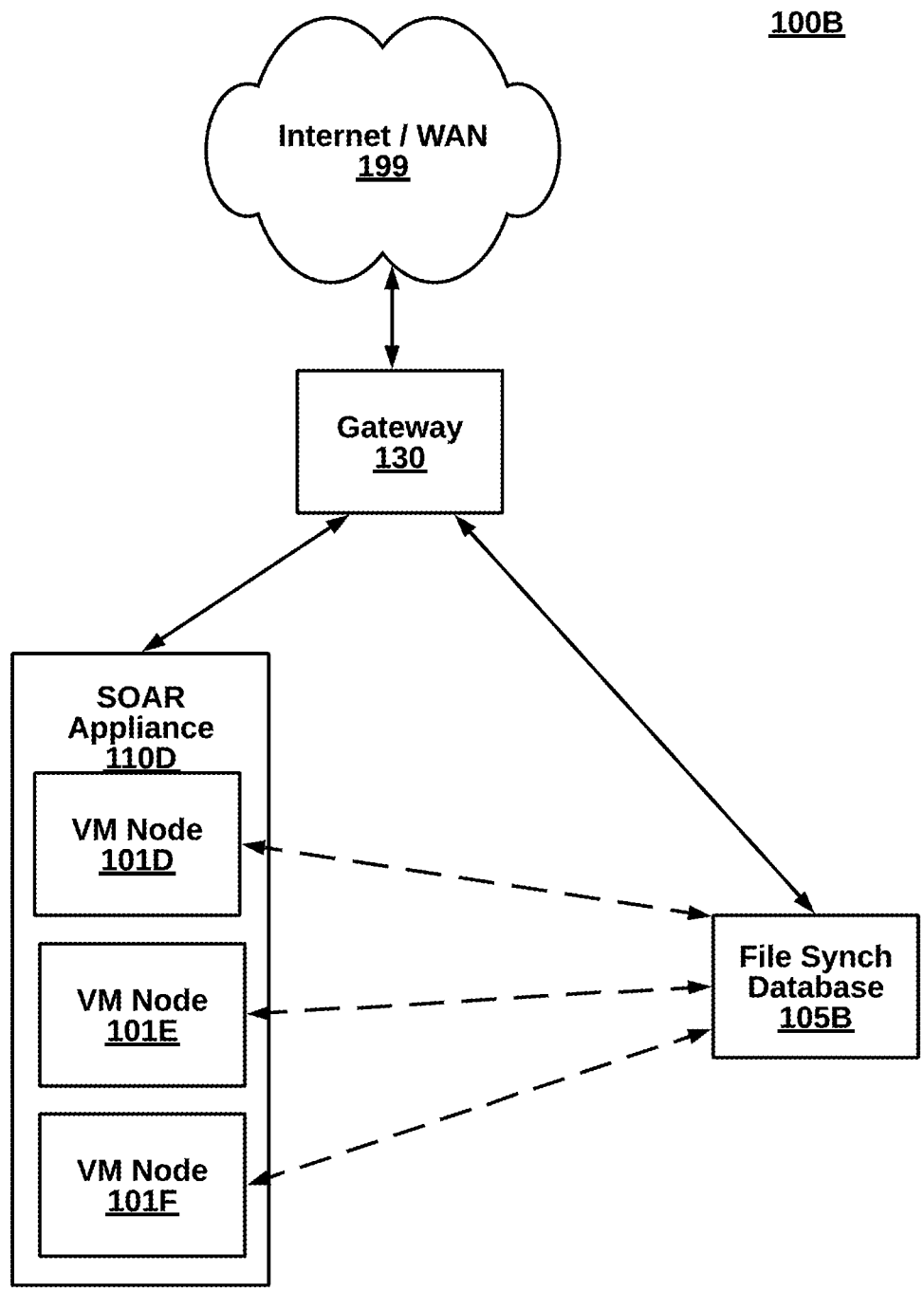
FIG. 1B is a block diagram illustrating a file sharing system for synchronizing VM nodes within a SOAR appliance, according to an embodiment.
Figure 2:
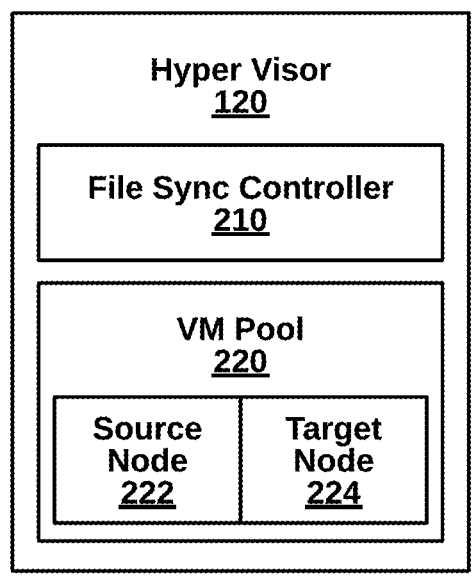
FIG. 2 is a more detailed block diagram illustrating a hypervisor of the file sharing system of FIG. 1, according to an embodiment.

FIG. 1B is a block diagram illustrating a file sharing system 100B for synchronizing VM nodes within a SOAR appliance 110D, according to an embodiment. Relative to FIG. 1A, VM nodes 101D-F are all hosted within a single SOAR appliance 110D. A gateway 130 separates a private network from external networks.

FIG. 2 is a more detailed block diagram illustrating a hypervisor 120 of the file sharing system of FIG. 1, according to an embodiment. The hypervisor 120 (representative of VM nodes 120A-D) includes a file sync controller 210, and a VM pool 220. The modules can be implemented in source code stored in non-transitory memory executed by a processor. Alternatively, the modules can be implemented in hardware with microcode. The modules can be singular or representative of functionality spread over multiple components. Many other variations are possible.

The hypervisor 120, also known as a VM monitor can create and monitor VMs in the VM pool 220. Physical hardware resources, such as CPU, memory and storage, are reallocated between VMs by the hypervisor 120. Operating system level components, such as a memory manager, process scheduler, input/output stack, device drivers, security manager, and a network stack, are utilized by the hypervisor 220 to run VMs.

The file sync controller 210 can receive notification of a file sharing command to share a specific file across at least two of the plurality of VMs as indicated in the file sharing command (e.g., csadm ha add-command --handler-type file handler --command-type copy --payload <payload>--nodeId <nodes>). The payload can be a stringified json data that has the following template:

```
{
  "source": {
    "paths": ["<list of file paths on source node>"],
    "exclude_extensions": ["<exclude files with given extension, e.g. [*.pyc, *.class]>"],
    "exclude_files": ["<list of file_paths to exclude>"]
  },
```

-continued

```
  "targets": {
    "path": "path on destination node",
    "permissions": {
      "selinux_context": "client node can specify selinux context for the shared files on target node. format - user:role:type",
      "ownership": "ownership of the files on target node. format - user:group",
      "mode": "access mode of file on target node - 0o777"
    }
  },
  "services_to_restart": ["<list of services to restart on target node after copying files>"]
}
```

The --nodeId parameter in the command specifies the target node on which to copy the files.

The VMs of the VM pool 220 play different roles at different times, depending on its current process content. With reference to the present disclosure, VMs can include a source node 222 to, responsive to receiving the file sharing command from a VM in the cluster of nodes, to copy the shared file to a source workspace directory and compress, and then copy the compressed file to the file sync database, wherein the command comprises a configuration template with file retrieval information. The VM pool 220 can also include a target node 224 to, listen for commands from other nodes in the cluster of nodes, and responsive to receiving the file sharing command, copy the compressed file to a target workspace directory and decompress, and then copy the shared file to the. In other embodiments, the source node 222 can be located remotely from the target node 224 in a different VM pool 220 and operate under a different hypervisor 220.

Some embodiments of the source node 222 and the target node 224 run different operating systems and use different file sharing technologies. The file sync controller 210 overcomes this problem as a common resource between different nodes.

Figure 3A:
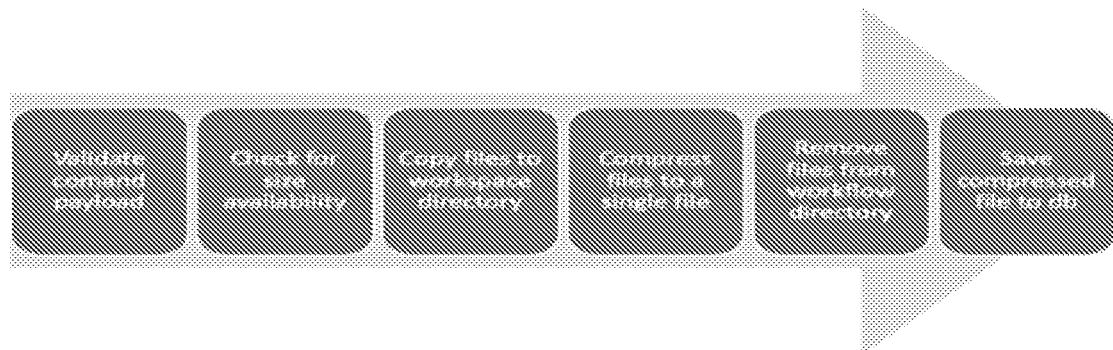
FIG. 3A is a block diagram illustrating a workflow for a source node of the system, according to an embodiment.

FIG. 3A is a block diagram illustrating a workflow for a source node of the system, according to an embodiment. In this case, the source node first validates a command payload of a command. A workspace is checked for size availability of a file and if acceptable, files are copied to a workspace directory. Multiple files can be compressed to a single file for easier distribution. The files are moved from the workspace directory and saved to a file sync database.

Figure 3B:
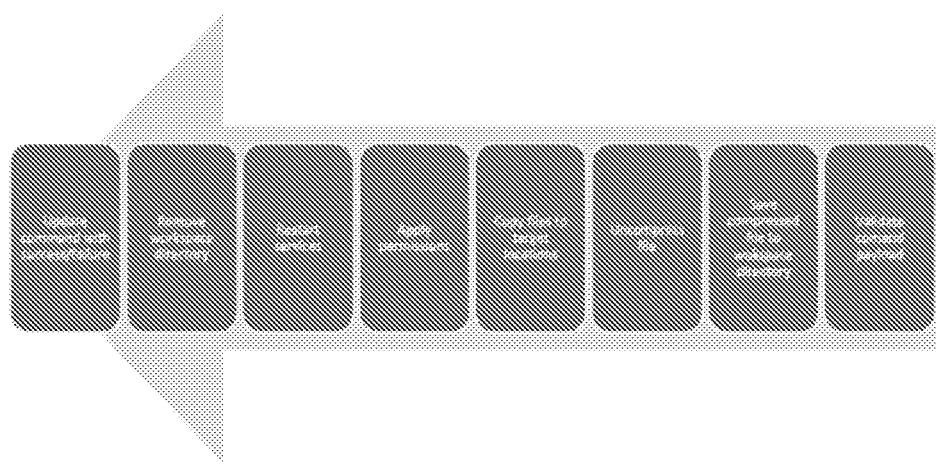
FIG. 3B is a block diagram illustrating a workflow for a target node of the system, according to an embodiment.

FIG. 3B is a block diagrams illustrating workflows for a target node of the system, according to an embodiment. Upon receiving a command, a payload of the command is validated. The compressed file is retrieved from the file sync database and saved to a workspace directory of the target node. Files are decompressed and saved to target locations. Permissions are applied and services are restarted. The file is then removed from the workspace directory and the command is updated with an outcome of success or failure.

Many alternatives to FIGS. 3A and 3B are possible for different implementations, as this embodiment represents just one possible combination of workflows.

II. Methods for Synchronizing VMs without File Sharing Technology (FIGS. 4-5)

Figure 4:
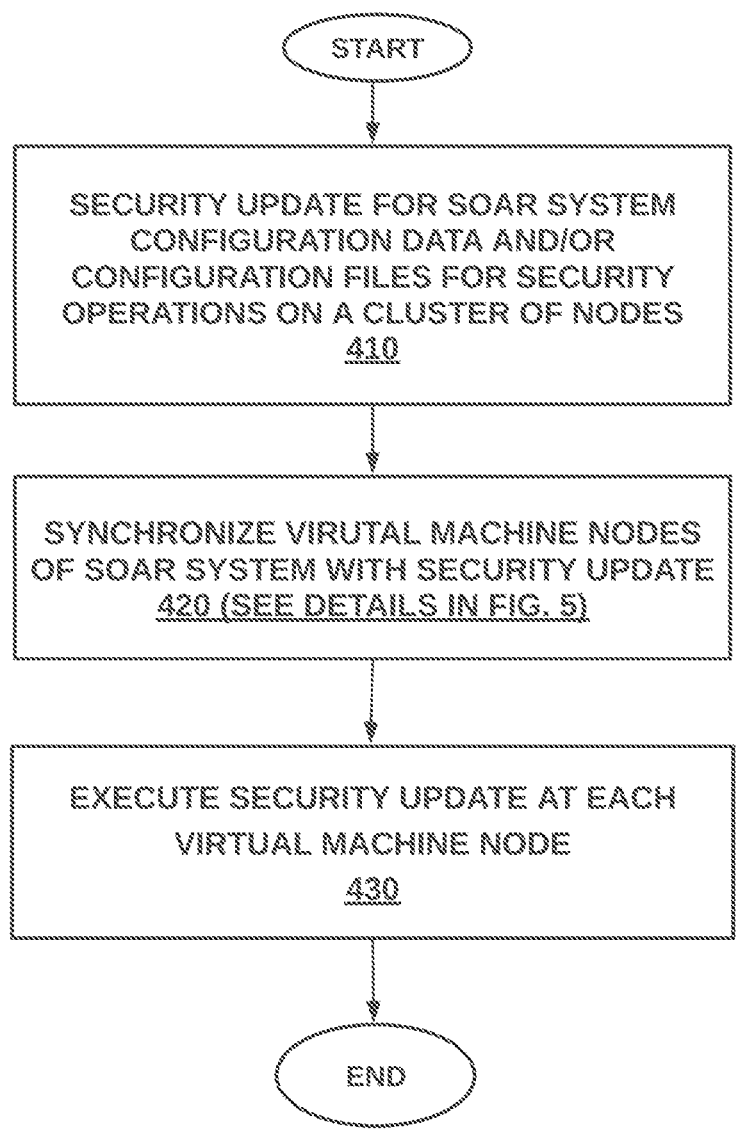
FIG. 4 is a high-level flow diagram illustrating a method for distributing SOAR updates to synchronize nodes, according to one preferred embodiment.
Figure 5:
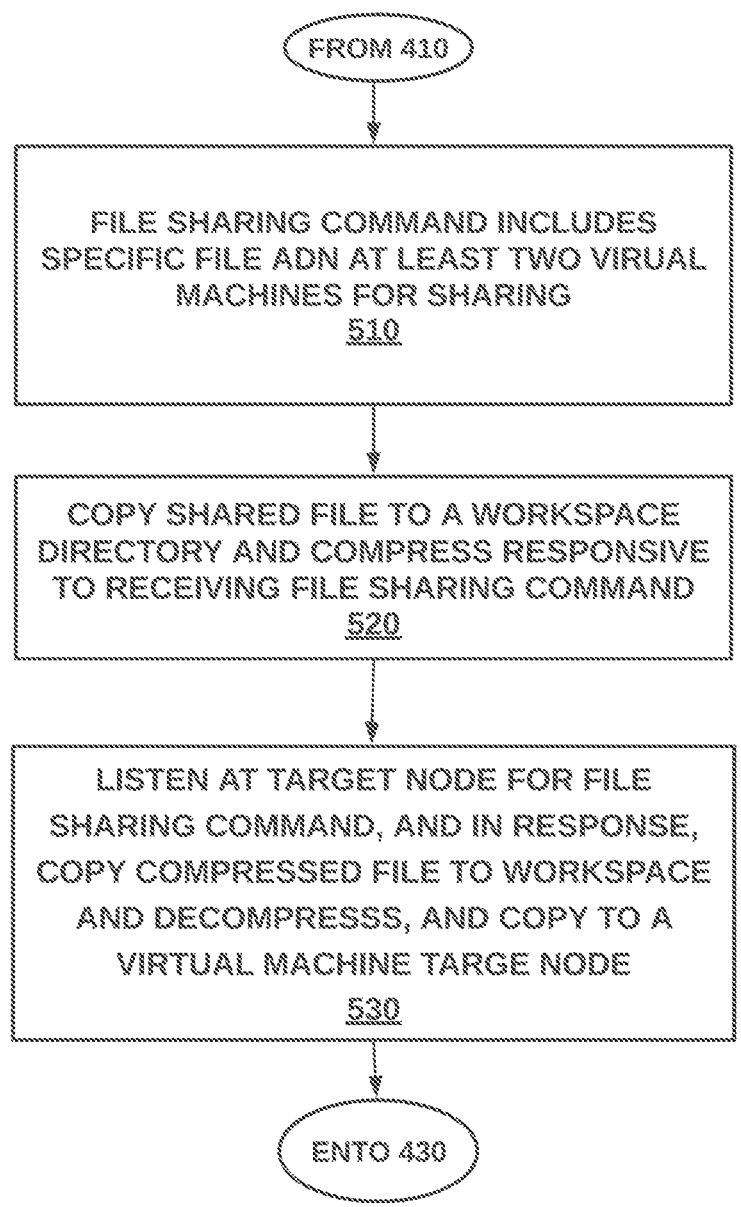
FIG. 5 is a more detailed flow diagram illustrating the step of synchronizing VM nodes of a file sharing system, for the method of FIG. 4, according to one embodiment.

FIG. 4 is a high-level flow diagram illustrating a method for distributing SOAR updates to synchronize nodes, according to one preferred embodiment. The method 400 can be implemented, for example, by the system 100. The steps are merely representative groupings of functionality, as there can be more or fewer steps, and the steps can be performed in different orders. Many other variations of the method 400 are possible.

At step 410, a user generated security update for a SOAR system comprising data and/or configuration files to support security operations on the cluster of nodes are stored in a file sync database.

At step 420, VM nodes of the SOAR system are synchronized with the security update. FIG. 5 is a more detailed flow diagram illustrating the step 420. More specifically, at step 510, notification of a file sharing command to share a specific file across at least two of the plurality of virtual machines as indicated in the file sharing command, is received. At step 520, a source node from the cluster of nodes to, responsive to receiving the file sharing command from a virtual machine in the cluster of nodes, to copy the shared file to a source workspace directory and compress, and then copy the compressed file to the file sync database, wherein the command comprises a configuration template with file retrieval information. At step 530, a target node from the cluster of nodes to, listen for commands from other nodes in the cluster of nodes, and responsive to receiving the file sharing command, copy the compressed file to a target workspace directory and decompress, and then copy the shared file to the target node, according to the file retrieval information. The permissions on the files and folders in the target location can be specified explicitly as part of the sync command. If not specified, the syn controller will keep the permissions the same as those of the corresponding files on the source node. Sync controller is also capable of restarting services on the target node, if needed to reflect the file changes.

Referring again to FIG. 4, at step 430, the SOAR system executes the security update at each node.

III. Generic Computing Environment

Figure 6:
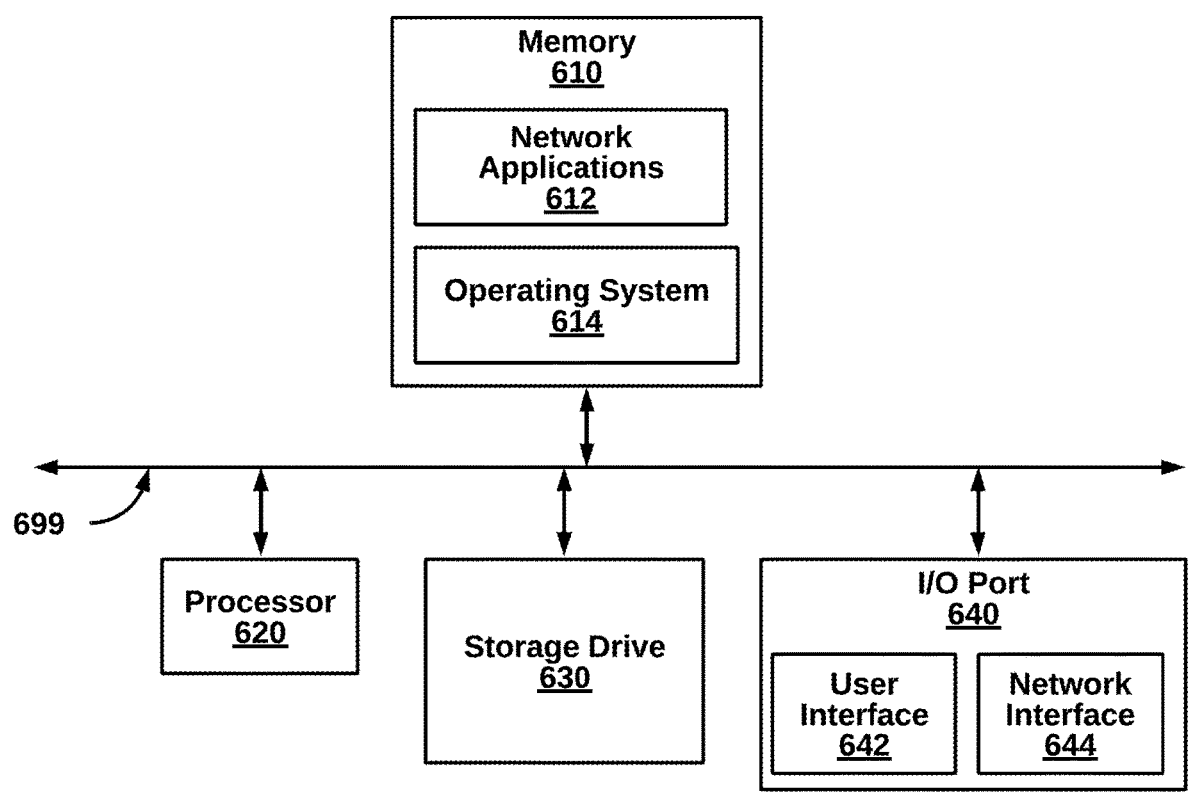
FIG. 6 is a high-level block diagram illustrating a computing device providing proxy encryption services for preventing malware execution by injecting virtual machine characteristics in a real computing environment of the computer device, according to an embodiment.

FIG. 6 is a block diagram illustrating a computing device 600 capable of implementing components of the system, according to an embodiment. The computing device 600, of the present embodiment, includes a memory 610, a processor 620, a storage drive 630, and an I/O port 640. Each of the components is coupled for electronic communication via a bus 699. Communication can be digital and/or analog and use any suitable protocol. The computing device 600 can be any of components of the system 100 (e.g., file sync database 105 and SOAR appliances 110A-D), other networking devices (e.g., an access point, a firewall device, a gateway, a router, or a wireless station), or a disconnected device.

Network applications 612 (e.g., VM nodes 120A-F) can be network browsers, daemons communicating with other network devices, network protocol software, and the like. An operating system 614 within the computing device 600 executes software, processes. Standard components of the real OS environment 614 include an API module, a process list, a hardware information module, a firmware information module, and a file system. The operating system 614 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. At least one security orchestration, automation and response (SOAR) appliance of a highly available (HA) security system on a data communication network, running a plurality of virtual machines within a cluster of nodes on at least one hypervisor, for sharing data and configuration files to synchronize a plurality of virtual machines independent of file sharing technology, the at least one SOAR appliance comprising:
   a processor;
   a network communication interface, communicatively coupled to the data communication network and to the processor; and
   a memory, communicatively coupled to the processor and the network communication interface and storing:
      a file sync database to store shared data and configuration files to support security operations on the cluster of nodes;
      a file sync controller to receive notification of a file sharing command to share a specific file across at least two of the plurality of virtual machines as indicated in the file sharing command;
      a virtual machine source node from the cluster of nodes to, responsive to receiving the file sharing command from an application in a virtual machine in the cluster of nodes, to copy the shared file to a source workspace directory and compress, and then copy the compressed file to the file sync database, wherein the command comprises a configuration template with file retrieval information; and
      a virtual machine target node from the cluster of nodes to, listen for commands from other nodes in the cluster of nodes, and responsive to receiving the file sharing command, copy the compressed file to a target workspace directory and decompress, and then copy the shared file to the target VM node, according to the file retrieval information.

2. The at least one computing device of claim 1, wherein the source node and the target node are both executing on the at least one SOAR appliance.

3. The at least one computing device of claim 1, wherein the source node is executing on a first SOAR appliance and the target node is executing on a second SOAR appliance, on the same local access network.

4. The at least one computing device of claim 1, wherein the source node executes on a first SOAR appliance on a first local access network and the target node executes on a second SOAR appliance on a second local access network.

5. The at least one computing device of claim 1, wherein the source node uses a first file sharing technology and the target node uses a second file sharing technology.

6. The at least one computing device of claim 1, wherein control module deletes the file from the workspace directory after being copied.

7. The at least one computing device of claim 1, further comprising a second target node, wherein responsive to the commend, the second target node copies the file from the workspace directory.

8. The at least one computing device of claim 1, wherein the source node and the target node are part of a highly available system.

9. The at least one computing device of claim 1, wherein the file comprises a configuration file for the cluster of nodes.

10. The at least one computing device of claim 1, further comprising a new node detector, wherein responsive to detecting onboarding of a new node, generating the command towards the new node as the target node to sync configuration files for the cluster of nodes.

11. The computing device of claim 1, wherein the file share command is responsive to a new node joining the cluster of nodes that needs to be synchronized.

12. The computing device of claim 1, wherein the computing device notifies a remote server responsive to the process not executing after exposure to the virtual machine parameters.

13. A method in at least one security orchestration, automation and response (SOAR) appliance of a highly available (HA) security system on a data communication network, running a plurality of virtual machines within a cluster of nodes on at least one hypervisor, for sharing data and configuration files to synchronize a plurality of virtual machines independent of file sharing technology, the method comprising the steps of:
   storing shared data and configuration files to support security operations on the cluster of nodes in a file sync database;
   receiving notification of a file sharing command to share a specific file across at least two of the plurality of virtual machines as indicated in the file sharing command;
   responsive to receiving the file sharing command at a virtual machine source node from an application in a virtual machine in the cluster of nodes, copying the shared file to a source workspace directory and compress, and then copy the compressed file to the file sync database, wherein the command comprises a configuration template with file retrieval information; and listening for commands from other nodes in the cluster of nodes, and responsive to receiving the file sharing command, copying the compressed file to a target workspace directory and decompress, and then copying the shared file to the target virtual machine node, according to the file retrieval information.

14. A non-transitory computer-readable media in at least one security orchestration, automation and response (SOAR) appliance of a highly available (HA) security system on a data communication network, running a plurality of virtual machines within a cluster of nodes on at least one hypervisor, implemented at least partially in hardware for, when executed by a processor, for sharing data and configuration files to synchronize a plurality of virtual machines independent of file sharing technology, the method comprising the steps of:

storing shared data and configuration files to support security operations on the cluster of nodes in a file sync database;

receiving notification of a file sharing command to share a specific file across at least two of the plurality of virtual machines as indicated in the file sharing command;

responsive to receiving the file sharing command from at a virtual machine source node an application in a virtual machine in the cluster of nodes, copying the shared file to a source workspace directory and compress, and then copy the compressed file to the file sync database, wherein the command comprises a configuration template with file retrieval information; and listening for commands from other nodes in the cluster of nodes, and responsive to receiving the file sharing command, copying the compressed file to a target workspace directory and decompress, and then copying the shared file to the target virtual machine node, according to the file retrieval information.

* * * * *